Feb. 7, 1928.
E. B. WHEELER
BATTERY
Filed June 22, 1927
1,658,315
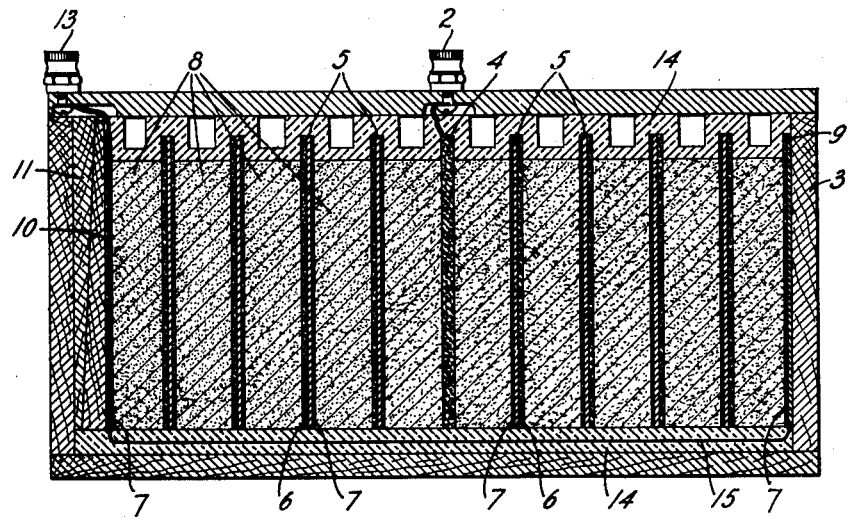
INVENTOR
EDMUND B. WHEELER
BY Irving Mac Donald
ATTORNEY Patented Feb. 7, 1928.

1,658,315

UNITED STATES PATENT OFFICE.

EDMUND B. WHEELER, OF NEW YORK, N. Y., ASSIGNOR TO BELL TELEPHONE LABORATORIES, INCORPORATED, OF NEW YORK, N. Y., A CORPORATION OF NEW YORK.

BATTERY.

Application filed June 22, 1927. Serial No. 200,516.

This invention relates to batteries and particularly to dry cell batteries employing flat electrodes.

It has heretofore been proposed to build a battery comprising a plurality of dry cells connected in series by assembling a row of metallic plates in a container with their faces in parallel planes. The plates are coated with a non-corrodible conducting composition, electro-negative with respect to the metal, and are separated by a depolarizer saturated with a suitable electrolyte. Where the available space permits, the internal resistance of such a battery may be decreased and therefore its life lengthened by employing plates having relatively large face areas. In many cases, however, as for instance in the telephone plant, the shape of the space available for dry batteries will not permit of increasing the face area of the plates.

In accordance with the present invention a battery of long life is provided which is of small weight and size for its capacity, is simple and cheap to manufacture and in which plates of small size may be used. In the specific form of the invention herein shown and described, there is provided a battery comprising a common electrode connected to one battery terminal, a plurality of unitary electrode structures formed of electrically connected parts of diverse polarity arranged in a row on opposite sides of the common electrode, and a depolarizer saturated with a suitable electrolyte separating the electrodes. Two electrodes on opposite sides of the common electrode are connected to another terminal of the battery, thus forming two groups of cells connected in parallel, each group comprising a plurality of cells connected in series. For cells employing plates of a given size, the internal resistance of a battery constructed in accordance with this invention is substantially one half that of a battery formed of a single group of series connected cells.

The invention may be readily understood by referring to the following detailed description and the accompanying drawing which is a vertical, longitudinal view in section of a dry cell battery constructed in accordance with the present invention.

Referring now to the drawing, the battery is built up of a single row of electrodes in the form of flat plates, the faces of which lie in substantially parallel planes, assembled in a container 3 of wood or other suitable material. The central electrode 4 of carbon is connected to the positive battery terminal 2 and serves as a common element for two adjacent cells. The metallic plates 5, preferably of zinc, are coated on the side remote from the carbon electrode 4 with a substantially non-corrodible conducting material 6, such as a mixture of graphite, oil and rosin. Sheets 7 of pulp board or other suitable material are positioned adjacent to the uncoated faces of the plates 5, and a depolarizer 8, such as a mixture of carbon and manganese dioxide, is positioned adjacent each of the pulp board sheets 7, filling the space between these sheets and the non-corrodible material 6 and between the sheets and the common electrode 4, respectively. The pulp board sheets 7 and the depolarizer 8 are saturated with a suitable electrolyte. There is no necessity for coating the end electrodes 9 and 10 and these may, therefore, be of uncoated zinc. The cells are preferably compressed in the container 3 by means of the wedge 11. The zinc plates 9 and 10 are connected together by the conductor 15 and connected to the negative battery terminal 13, thus forming a battery of cells connected in series parallel. The cells are insulated by means of a plastic insulating material 14, which is poured about the cells.

It is also within the scope of the invention to employ a common central electrode of zinc and a plurality of zinc electrodes coated on the sides facing the common electrode with a non-corrodible conducting composition and connecting together two zinc electrodes on opposite sides of the common electrode.

What is claimed is:

1. A series multiple battery, comprising a common electrode, a plurality of unitary electrode structures formed of electrically connected parts which serve as anode and cathode for adjacent cells, respectively, these unitary electrode structures being located on opposite sides of said common electrode, and a depolarizer saturated with an electrolyte separating said electrodes.

2. A series multiple battery, comprising a common electrode connected to one terminal of said battery, a plurality of unitary electrode structures formed of electrically connected parts which serve as anode and cathode for adjacent cells, respectively, these unitary electrode structures being located on opposite sides of said common electrode, a depolarizer saturated with an electrolyte separating said electrodes, and means for connecting two of said electrodes located on opposite sides of said common electrode to another terminal of said battery.

3. A series multiple battery, comprising a plurality of substantially flat cells placed in juxtaposition, said cells comprising a common electrode connected to one terminal of said battery, a plurality of unitary electrode structures formed of electrically connected parts which serve as anode and cathode for adjacent cells, respectively, these unitary electrode structures being located on opposite sides of said common electrode, and a depolarizer saturated with an electrolyte separating said electrodes, one of said unitary electrode structures on each side of said common electrode being connected to another terminal of said battery.

4. A series multiple battery comprising a casing, a plurality of substantially flat cells arranged in a single row in said casing, a centrally disposed carbon electrode connected to one terminal of said battery, a plurality of spaced zinc electrodes located on opposite sides of said carbon electrode and coated on the side remote from said carbon electrode with a non-corrodible conducting material, sheets of insulating absorbent material adjacent to the uncoated faces of said zinc electrodes, a depolarizer adjacent to the coated face of said zinc electrodes, said insulating material and said depolarizer being saturated with an electrolyte, and means for connecting one electrode on each side of said carbon electrode to another terminal of said battery.

In witness whereof, I hereunto subscribe my name this 10th day of June A. D., 1927.

EDMUND B. WHEELER.